United States Patent
Rune et al.

(10) Patent No.: US 6,788,936 B1
(45) Date of Patent: *Sep. 7, 2004

(54) GATEWAY LOCATION REGISTER FAULT RECOVERY

(75) Inventors: Johan Rune, Lidingö (SE); Yun Chao Hu, Yokohama (JP); Juan Noguera-Rodriguez, Tokyo (JP)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,907

(22) Filed: Apr. 12, 2000

Related U.S. Application Data (60) Provisional application No. 60/128,786, filed on Apr. 12, 1999.

(51) Int. Cl.[7] ................................................ H04Q 7/20

(52) U.S. Cl. .................. 455/433; 455/432.1; 455/456.1

(58) Field of Search ............................... 455/433, 432.1, 455/432.3, 414.2, 404.2, 436, 437, 438, 439, 442, 456.1, 435.1, 435.2, 561, 560

(56) References Cited

U.S. PATENT DOCUMENTS

| | | | |
|---|---|---|---|
| 5,610,974 A | | 3/1997 | Lantto .......................... 379/59 |
| 6,314,284 B1 | * | 11/2001 | Patel et al. .................. 455/417 |
| 6,363,144 B1 | * | 3/2002 | Becher et al. ......... 379/211.01 |
| 6,400,946 B1 | * | 6/2002 | Vazvan et al. ............ 455/432.1 |
| 6,556,823 B2 | * | 4/2003 | Clapton et al. ............. 455/433 |
| 6,611,685 B1 | * | 8/2003 | Rune et al. .................. 455/433 |

FOREIGN PATENT DOCUMENTS

| | | |
|---|---|---|
| DE | 196 40 288 | 4/1998 |
| WO | WO 94/21090 | 9/1994 |

OTHER PUBLICATIONS

S. Chen et al.: "Fault Tolerance of PCS Mobility Databases"; Proceedings of the International Conference On Computer Communications and Networks, Sep. 22, 1997, IEEE, XP002061518 pp., 542–547.

"Procedure for Restoration of HLR", European Telecommunication Standard, vol. GSM 9.02, No. Version 3.8.0, 1991, p. 275, ETSI, XP000652720.

Yasuyuki Uchiyama et al.: "Network Functions and Signals for Personal Roaming Between Digital Cellular Standards"; NTT Mobile Communcations Network Inc., Apr. 1995, 1995 Fourth IEEE International Conference On Universal Personal Communications Record Meiji Kinenkan, Tokyo, Japan Nov. 6–10, 1995, pp. 447–451.

PCT International Search Report dated May 10, 2001.
PCT International Search Report dated Jul. 27, 2000.

TS GSM 09.02, "Digital Cellular Telecommunications System (Phase 2+) Mobile Application Part (MAP) Specification", from ETSI, Mar. 12, 1999, pp. 472–475.

* cited by examiner

Primary Examiner—Tony T. Nguyen (57) ABSTRACT

A gateway location register (GLR) can restore data by sending a reset message to all of the visitor location registers (VLR) associated with the GLR. Alternatively, the data in the GLR can be restored when a request for a roaming number is sent to the GLR from a home location register (HLR). In any case the location information is restored from the VLR and the subscriber profile from the HLR. If the GLR has a backup memory, the GLR can forward a request for a roaming number to a VLR which is indicated by the backup memory as serving the mobile subscriber associated with the roaming number request received from the HLR. If the information contained in the backup memory is incorrect, the GLR can send a request to restore data to all VLRs associated with the GLR. Further, the GLR, upon receipt of a roaming number request for a subscriber whose serving VLR is unknown, the GLR can send an error indication to the HLR and wait for a location update from a serving VLR. In addition, if the backup data is incorrect or non-existent, the GLR can send a request for a roaming number to all its associated VLRs which have not yet received the request.

20 Claims, 10 Drawing Sheets

GATEWAY LOCATION REGISTER FAULT RECOVERY

CROSS-REFERENCE TO RELATED APPLICATIONS

REFERENCED-APPLICATIONS

This application claims priority under 35 U.S.C. §§119 and/or 365 to U.S. Provisional Application No. 60/128,786 filed on Apr. 12, 1999, the entire content of which is hereby incorporated by reference. This application is also related to the following co-pending applications filed on Apr. 12, 2000: U.S. patent application Ser. No. 09/453,906 "Home Location Register Fault Recovery"; U.S. patent application Ser. No. 09/453,908 "Support For Features Associate With A Subscriber in Networks With A Gateway Location Register And A Visitor Location Register"; and U.S. patent application Ser. No. 09/547,991 "Gateway Location Registers In A UMTS System", all of which are herein expressly incorporated by reference.

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Related Art

Not Applicable

2. Field of the Invention

The present invention relates to mobile communications systems, and more specifically, to recovery of a gateway location register from a fault.

Figure 1:
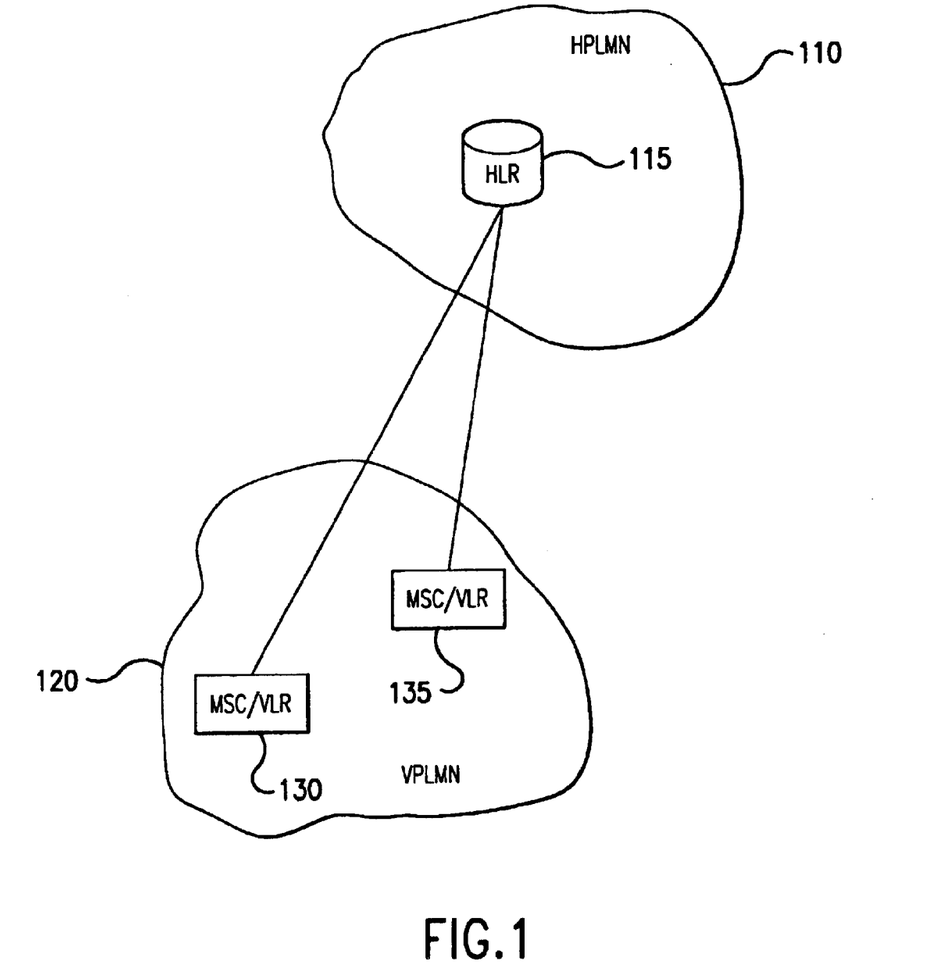
FIG. 1 illustrates a conventional GSM network.

FIG. 1 illustrates a wireless communication system in accordance with the Global System for Mobile communication (GSM) standard. The GSM standard is designed to provide a uniform interface which allows mobile communication subscribers of various countries to operate their mobile devices regardless of the current location of the mobile subscriber. A mobile subscriber typically has a subscription with a network which is designated as the mobile subscriber's home public land mobile network 110 (HPLMN). The HPLMN 110 has a home location register (HLR) 115 which contains, among other things, various information regarding the services provided to the mobile subscriber. When a mobile subscriber roams into a different network, which is referred to as a visited public land mobile network 120 (VPLMN), the VPLMN requires certain data regarding the mobile subscriber's subscription. The data regarding the mobile subscribers subscription is also known as the mobile subscriber's profile. The mobile subscriber's profile is transferred from the HLR to a visitor location register (VLR) in the VPLMN 120.

In a GSM system mobile subscriber data is stored within the VLR that is associated with the mobile services switching center (MSC) that currently serves the mobile subscriber in order to reduce internetwork signaling between VLRs and HLRs. The decentralization of the VLRs within a GSM system (i.e., each MSC being equipped with a VLR) reduces internetwork signaling as well. So, for example, if the mobile subscriber is roaming in an area of the VPLMN 120 which is controlled by the MSC/VLR 130, the HLR 115 will transfer the mobile subscriber's profile to MSC/VLR 130. Similarly, if the mobile subscriber is roaming in an area controlled by MSC/VLR 135, the HLR 115 will transfer the mobile subscriber's profile to MSC/VLR 135. Although FIG. 1 illustrates the MSC/VLR as a single network node, one skilled in the art will recognize that the MSC and VLR can be implemented as separate network elements.

Figure 2:
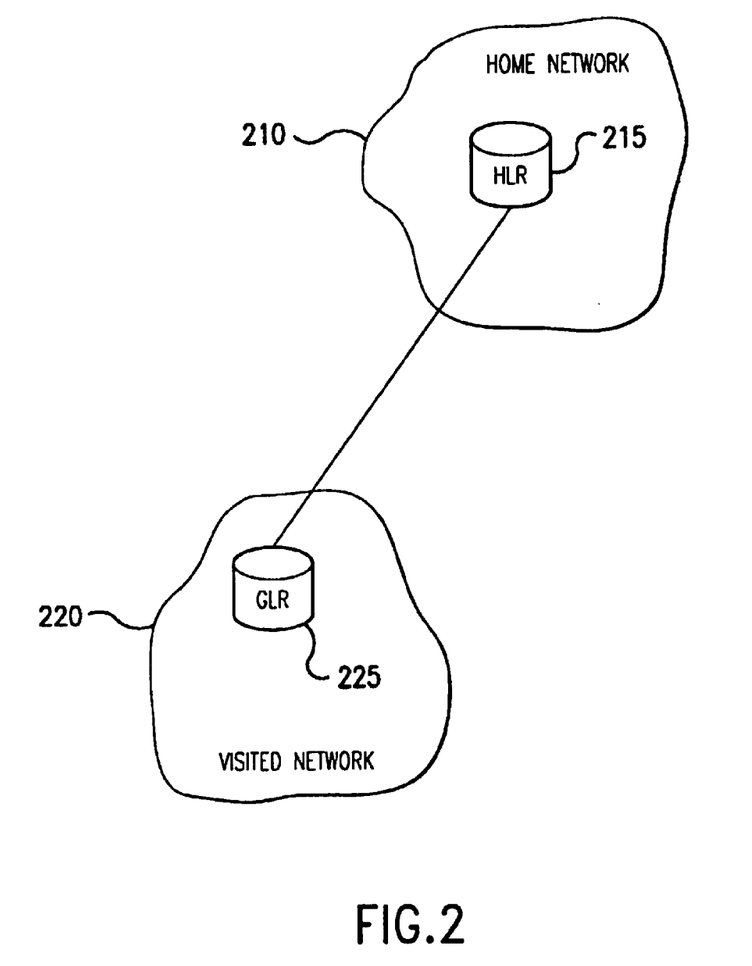
FIG. 2 illustrates a conventional PDC network.

To increase the compatibility of GSM with other types of systems, it is anticipated that future versions of the GSM standard, also called Universal Mobile Telecommunications System (UMTS) will incorporate elements of other mobile communications systems. For example, the Japanese Personal Digital Cellular (PDC) system includes a network node which is used to reduce internetwork signaling known as a gateway location register (GLR). FIG. 2 illustrates an exemplary mobile communications system in accordance with the PDC system. Like a GSM system, a home network 210 includes an HLR 215 which contains the mobile subscriber's profile. When a mobile subscriber roams into a visited network 220 the mobile subscriber's profile is transferred to GLR 225. In GSM terms, the GLR can be described as a VLR for all mobile subscribers roaming from other networks. Hence, only one GLR is needed in each network.

Figure 3:
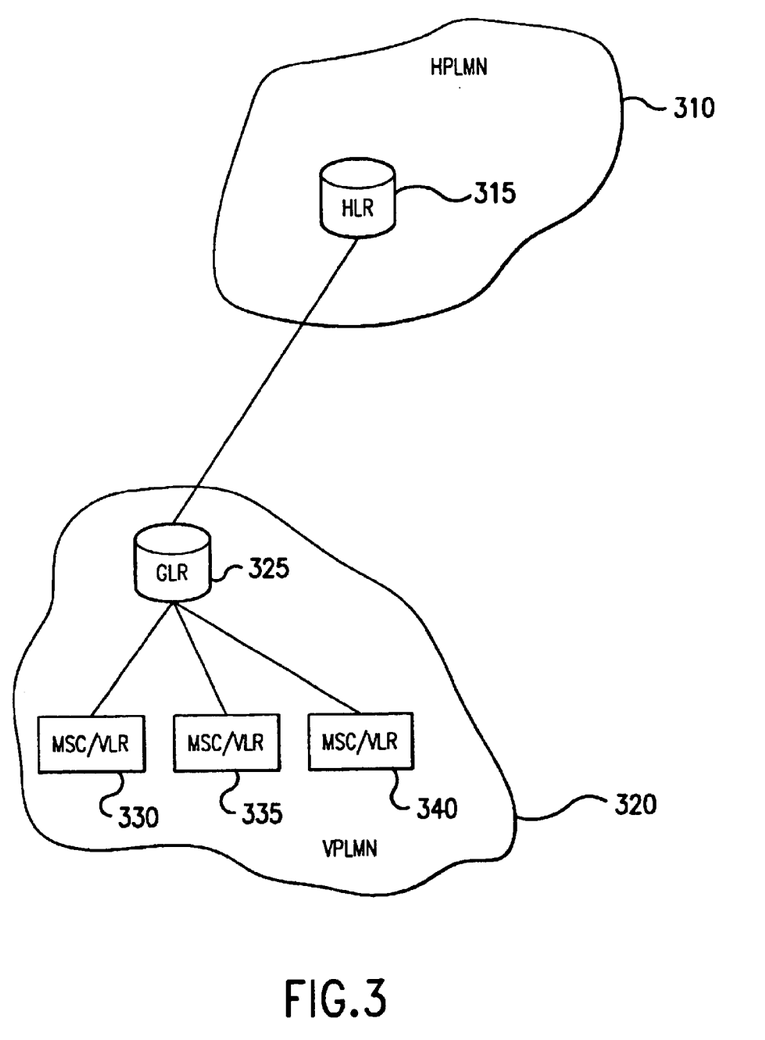
FIG. 3 illustrates a UMTS network which includes a GLR.

FIG. 3 illustrates an exemplary UMTS system which incorporates the GLR of the PDC system. When a mobile subscriber of HPLMN 310 roams into VPLMN 320, the HLR 315 will transfer the mobile subscriber's profile to GLR 325. Then, depending upon which area within the VPLMN 320 the mobile subscriber is roaming, the GLR 325 will transfer the mobile subscriber's profile to the respective MSCNLR 330, 335 or 340. The introduction of the GLR 325 into a GSM/UMTS system reduces internetwork signaling because once the mobile subscriber roams into VPLMN 320, the HLR will only need to transfer the mobile subscriber's profile to GLR 325. GLR 325 will be responsible for transferring the mobile subscriber's profile to the proper MSC/VLR within VPLMN 320 as the mobile subscriber travels around the VPLMN 320.

The protocol used by GSM/UMTS systems for transferring data between VLRs and HLRs is the mobile applications part (MAP). Since GLRs are optional elements within the UMTS system, MAP procedures must be completely independent of the presence or absence of GLRs in a network. Accordingly, by using an HLR interface towards the VLRs and a VLR interface towards the HLRs, the GLR should be completely transparent. However, because of the dual nature of the GLR in the network it may be difficult for the GLR to behave in a way which simultaneously will be perceived as VLR behavior by the HLRs, and as HLR behavior by the VLRs. One such case is the fault recovery behavior of the GLR.

Figure 4:
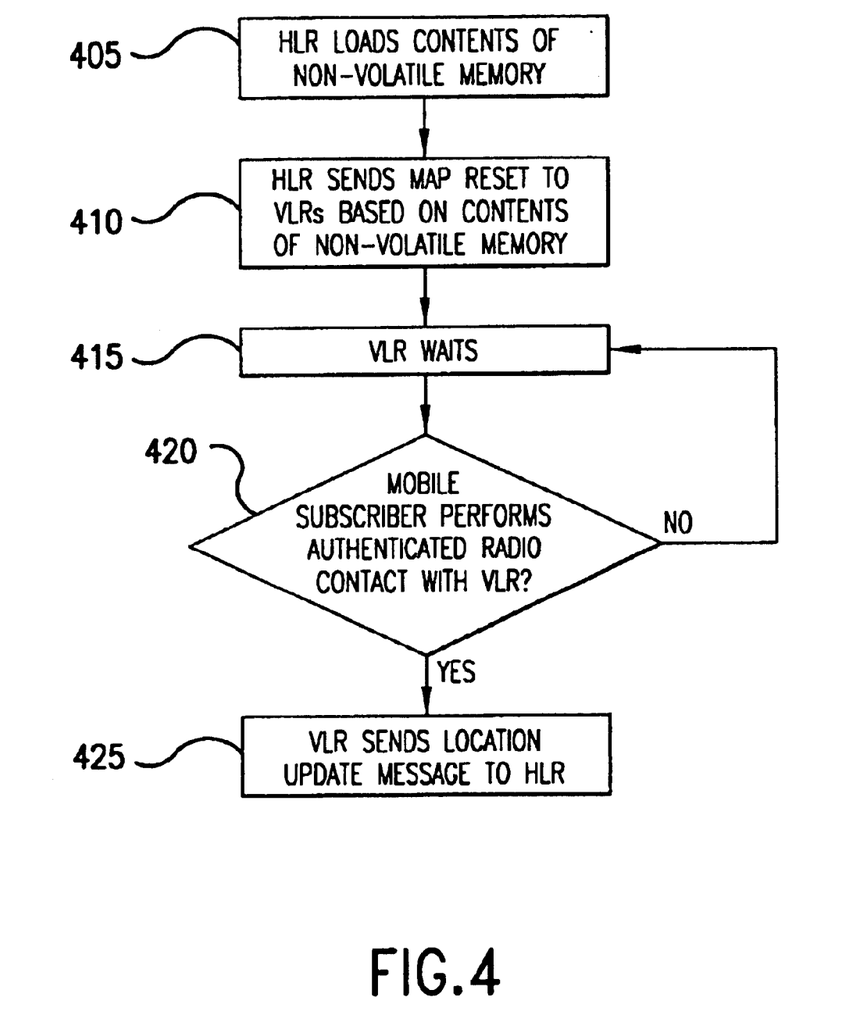
FIG. 4 illustrates a conventional method in a GSM system when an HLR is recovering from a fault.

FIG. 4 illustrates a conventional method in a GSM system when an HLR is recovering from a fault. In step 405 the HLR loads the contents of its non-volatile backup memory into its dynamic memory. Next the HLR sends a MAP_RESET message to the VLRs to which the HLR's subscribers are currently associated as indicated by the information in the backup memory in accordance with step 410. The MAP_RESET message triggers the VLRs to initiate a location update procedure towards the HLR at the next authenticated radio contact with a concerned mobile subscriber. Accordingly, in step 415 the VLR waits for an authenticated radio contact from the concerned mobile subscriber. In step 420 the VLR determines whether it has received an authenticated radio contact from the concerned mobile subscriber. If the VLR has not received an authenticated radio contact from the concerned mobile subscriber, in accordance with the "No" path out of decision step 420, the VLR continues to wait in accordance with step 415. If the VLR receives an authenticated radio contact from the concerned mobile subscriber the VLR sends a MAP_UPDATE_LOCATION message to the HLR indicating that the VLR is serving the concerned subscriber in accordance with step 425. The location updates sent from the VLRs to the HLR will gradually restore and confirm the subscriber data of the restarted HLR.

Figure 5:
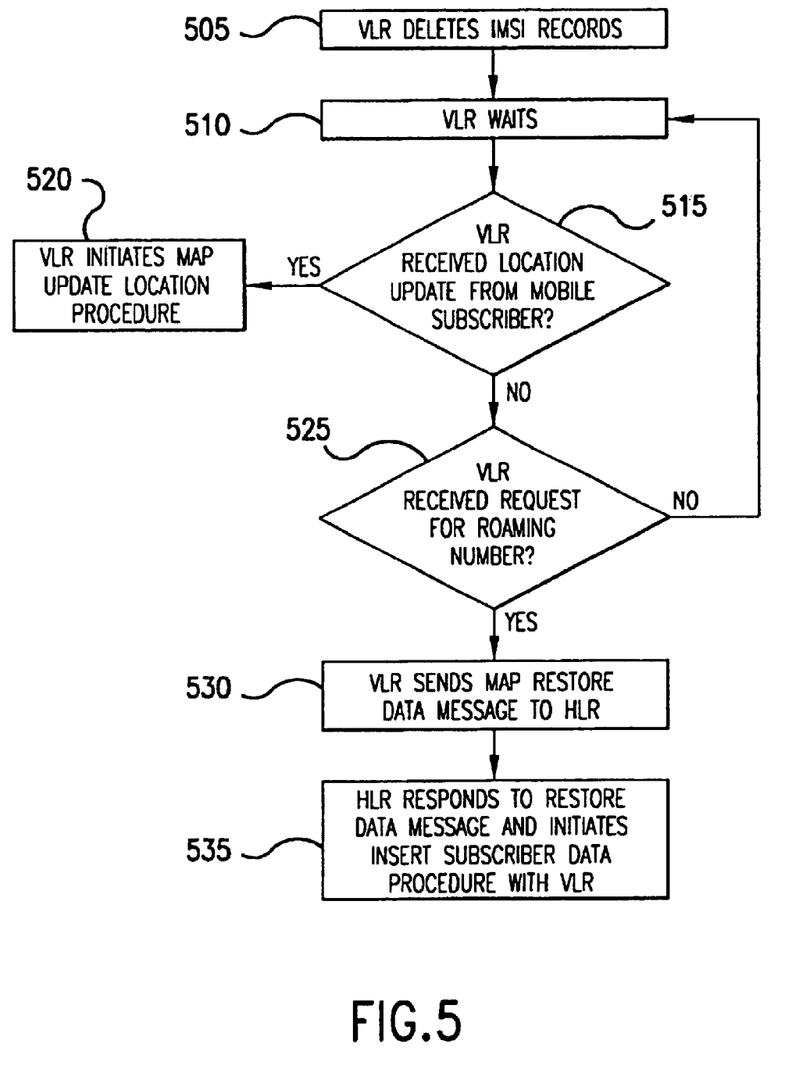
FIG. 5 illustrates a conventional method in a GSM system when a VLR is recovering from a fault.

FIG. 5 illustrates a conventional method in a GSM system when a VLR is recovering from a fault. In step 505 the VLR, which does not have a non-volatile backup memory for its dynamic subscriber data, deletes all IMSI records which remain in its dynamic memory. In step 510 the VLR waits for contact from either a mobile subscriber or from the HLR associated with a mobile subscriber. In step 515, the VLR determines whether it has received a location update request from a mobile subscriber. If the VLR receives a location update request from a mobile subscriber, in accordance with the "Yes" path out of decision step 515, the VLR initiates the MAP_UPDATE_LOCATION procedure with the HLR associated with the mobile subscriber in accordance with step 520. The MAP_UPDATE_LOCATION procedure is used to send data associated with a mobile subscriber from an HLR to a VLR. Specifically, this data is sent in the framed MAP_INSERT_SUBSCRIBER_DATA indication message.

If the VLR has not received a location update request from a mobile subscriber, in accordance with the "No" path out of decision step 515, the VLR determines whether it has received a roaming number request from an HLR in accordance with step 525. If a VLR has not received a roaming number request from an HLR, in accordance with the "No" path out of decision step 525, then the VLR continues to wait for a contact from either a mobile subscriber or from an HLR in accordance with step 510. If the VLR has received a request for roaming number from an HLR, in accordance with the "Yes" path out of decision step 525, then the VLR sends a MAP_RESTORE_DATA message, including an indication of the concerned subscriber whose data is being restored, to the HLR indicating that the VLR has experienced a fault in accordance with step 530. In response to the MAP_RESTORE_DATA message the HLR initiates the framed MAP_INSERT_SUBSCRIBER_DATA procedure with the VLR to provide subscriber data to the VLR in accordance with step 535.

Due to the GLR's role in the network there is currently no provision for satisfying both the specified HLR behavior and VLR behavior during fault recovery. For example, the specified HLR fault recovery behavior requires that the GLR include a non-volatile memory for restoring backup data. However, GLRs may not have a non-volatile backup memory. In addition, the specified VLR fault recovery behavior requires that when a MAP_PROVIDE_ROAMING_NUMBER request message is received from the HLR, the GLR must unambiguously know to which VLR to forward the request to. However, since the GLR has lost its data due to the fault, the GLR will not know which VLR is currently supporting the mobile subscriber. Further, even assuming that the GLR has a non-volatile backup memory, the data stored in the non-volatile backup memory may be inaccurate, as a mobile subscriber may have moved to an area supported by another VLR since the last time the GLR has performed a backup. On the other hand, in a network without a GLR, a fault recovering VLR receiving a MAP_PROVIDE_ROAMING_NUMBER request message does not have this problem, since it does not have to forward the message. The fault recovering VLR assumes that since the HLR sent the MAP_PROVIDE_ROAMING_NUMBER to it, the indicated mobile subscriber is located in the service area of the fault recovering VLR. Consequently, the mobile subscriber's profile should be restored from the HLR.

Accordingly, it would be desirable to provide methods and apparatus for GLR fault recovery in a UMTS system. Further, it would be desirable for the GLR fault recovery to be performed without violating the MAP protocol, i.e. using the specified message formats and not violating any specified message sequences.

BRIEF SUMMARY OF THE INVENTION

According to exemplary embodiments of the present invention, methods and apparatus are provided for recovering from a fault in a radio communications network which includes a visitor location register and a gateway location register. A reset message is sent from the gateway location register to all visitor location registers associated with the gateway location register. A location update request is received by the gateway location register from one of the visitor location registers associated with the gateway location register. A location of a mobile subscriber is updated in the gateway location register in accordance with a location indicated in the location update message.

In accordance with another aspect of the present invention a roaming number request for a mobile subscriber is received by the gateway location register from a home location register associated with the mobile subscriber. The roaming number request is forwarded from the gateway location register to all visitor location registers associated with the gateway location register. A roaming number is received by the gateway location register from a visitor location register which is serving the mobile subscriber.

In accordance with this aspect of the present invention a restore data request message can be received by the gateway location register from visitor location registers which are not serving the mobile subscriber. A restore data response message can be sent from the gateway location register to the visitor location registers which are not serving the mobile subscriber, the restore data response message contains an error indication.

In accordance with yet another aspect of the present invention data from a backup memory is loaded in the gateway location register. A roaming number request for a mobile subscriber is received by the gateway location register from a home location register associated with the mobile subscriber. The roaming number request is forwarded from the gateway location register to a visitor location register, wherein the data loaded from the backup memory indicates that the visitor location register is serving the mobile subscriber.

In accordance with this aspect of the present invention a roaming number can be received by the gateway location register from the visitor location register which is serving the mobile subscriber. The roaming number can be forwarded by the gateway location register to the home location associated with the mobile subscriber.

Further in accordance with this aspect of the present invention a message indicating that the mobile subscriber is not being served by the visitor location register can be received by the gateway location register. A reset message can be sent by the gateway location register to all visitor location registers associated with the gateway location register other than the visitor location register from which the gateway location register received the message indicating that the mobile subscriber is not being served.

In accordance with a further aspect of the present invention a reset message is sent from the gateway location register to all visitor location registers associated with the gateway location register. The gateway location register waits for a location update message from a visitor location register which indicates that the subscriber indicated in the location update message is being served by the visitor location register.

In accordance with this aspect of the present invention the gateway location register can receive from a home location register a roaming number request for a mobile subscriber associated with the home location register. The gateway location register can send a roaming number response message to the home location register, wherein the roaming number response message includes an error indication.

BRIEF DESCRIPTION OF THE SEVERAL VIEWS OF THE DRAWINGS

The present invention will now be described with reference to the accompanying drawings in which.

DETAILED DESCRIPTION OF THE INVENTION

In the following description, for purposes of explanation and not limitation, specific details are set forth, such as particular sequences of inter and intra network signaling, types of messages, etc. in order to provide a thorough understanding of the present invention. However, it will be apparent to one skilled in the art that the present invention may be practiced in other embodiments that depart from these specific details. In other instances, detailed descriptions of well-known methods, devices, and network elements are omitted so as not to obscure the description of the present invention.

The exemplary radio communication systems discussed herein are described as operating in accordance with the GSM system, however, one skilled in the art will recognize that the present invention can be implemented in other mobile communications systems where a gateway is used to reduce internetwork signaling.

Since a GLR in the UMTS system may or may not have a non-volatile backup memory for its dynamic subscriber data, a GLR fault recovery technique should address both situations.

Figure 6:
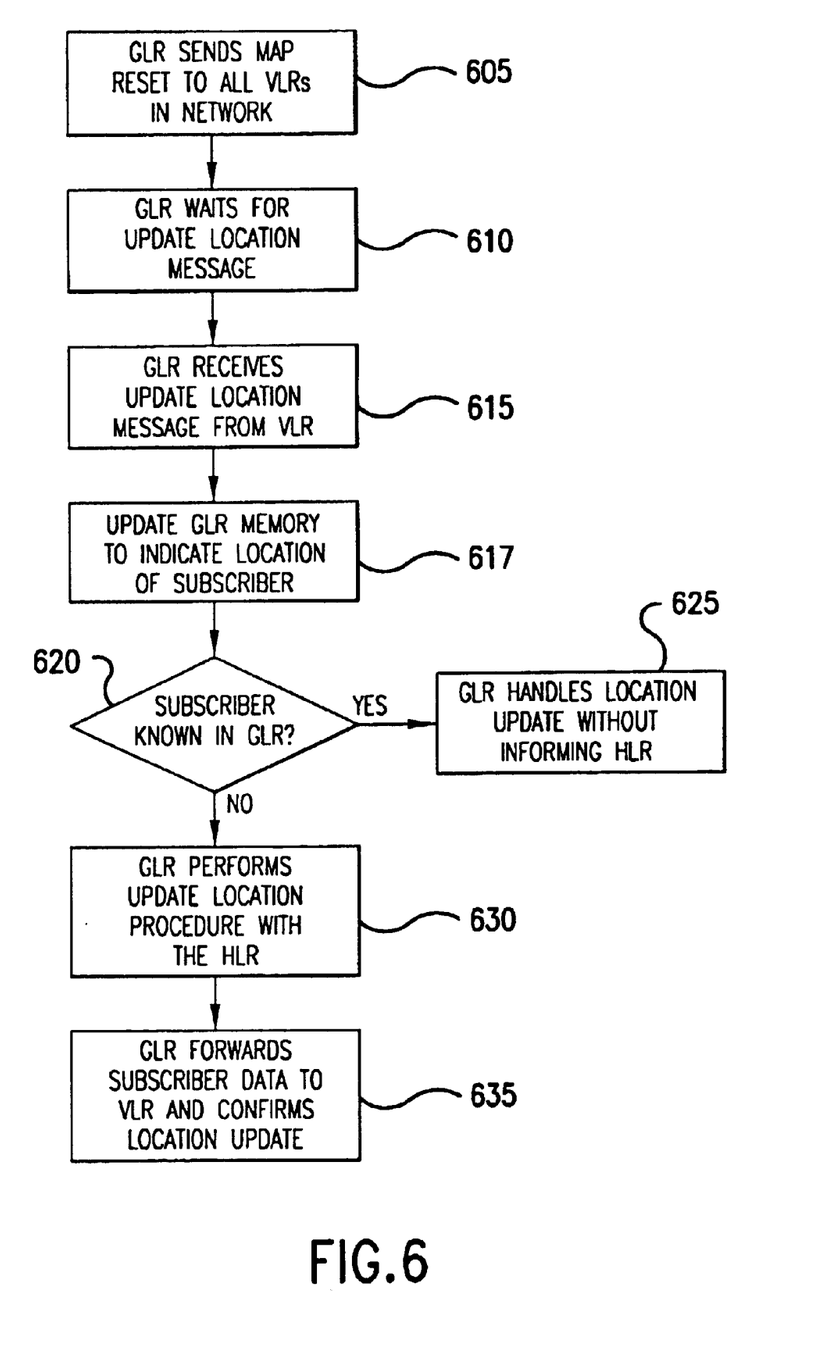
FIG. 6 illustrates an exemplary method in a UMTS system when a GLR, in its role as an HLR, is recovering from a fault in accordance with one embodiment of the present invention.

FIG. 6 illustrates an exemplary method in a UMTS system when a GLR, in its role as an HLR, is recovering from a fault. In accordance with this embodiment of the present invention the GLR does not have a backup memory for its dynamic subscriber data. In step 605 the GLR sends a MAP_RESET message to all of the VLRs which are supported by the GLR. In step 610 the GLR waits for MAP_UPDATE_LOCATION messages from the VLRs. Conventionally an HLR would determine which VLRs to send a MAP_RESET message to based on the information contained in the non-volatile backup memory. Since according to this embodiment of the present invention the GLR, unlike an HLR, does not have a non-volatile backup memory the GLR does not know to which VLRs to send the MAP_RESET message. Consequently, it will have to send the message to all the VLRs in its network and then wait for location updates from the VLRs.

In step 615 the GLR receives a MAP_UPDATE_LOCATION request from a VLR. In step 617 the GLR updates the subscriber location in the GLR memory in accordance with the location indicated in the MAP_UPDATE_LOCATION request. In step 620, the GLR determines whether the mobile subscriber associated with the MAP_UPDATE_LOCATION message is known to the GLR. If the subscriber is known in the GLR (e.g., due to restored mobile subscriber data from the HLR), in accordance with the "Yes" path out of decision step 620, the GLR will handle the location update request without informing the HLR in accordance with step 625.

If the mobile subscriber associated with the MAP_UPDATE_LOCATION message is unknown to the GLR, in accordance with the "No" path out of decision step 620, the GLR performs a MAP_UPDATE_LOCATION procedure with the HLR associated with the particular mobile subscriber in accordance with step 630. The MAP_UPDATE_LOCATION procedure will trigger the HLR to provide the mobile subscriber's data to the GLR. The GLR then forwards the requested subscriber data to the VLR and confirms the location update to the VLR in accordance with step 635.

Figure 7:
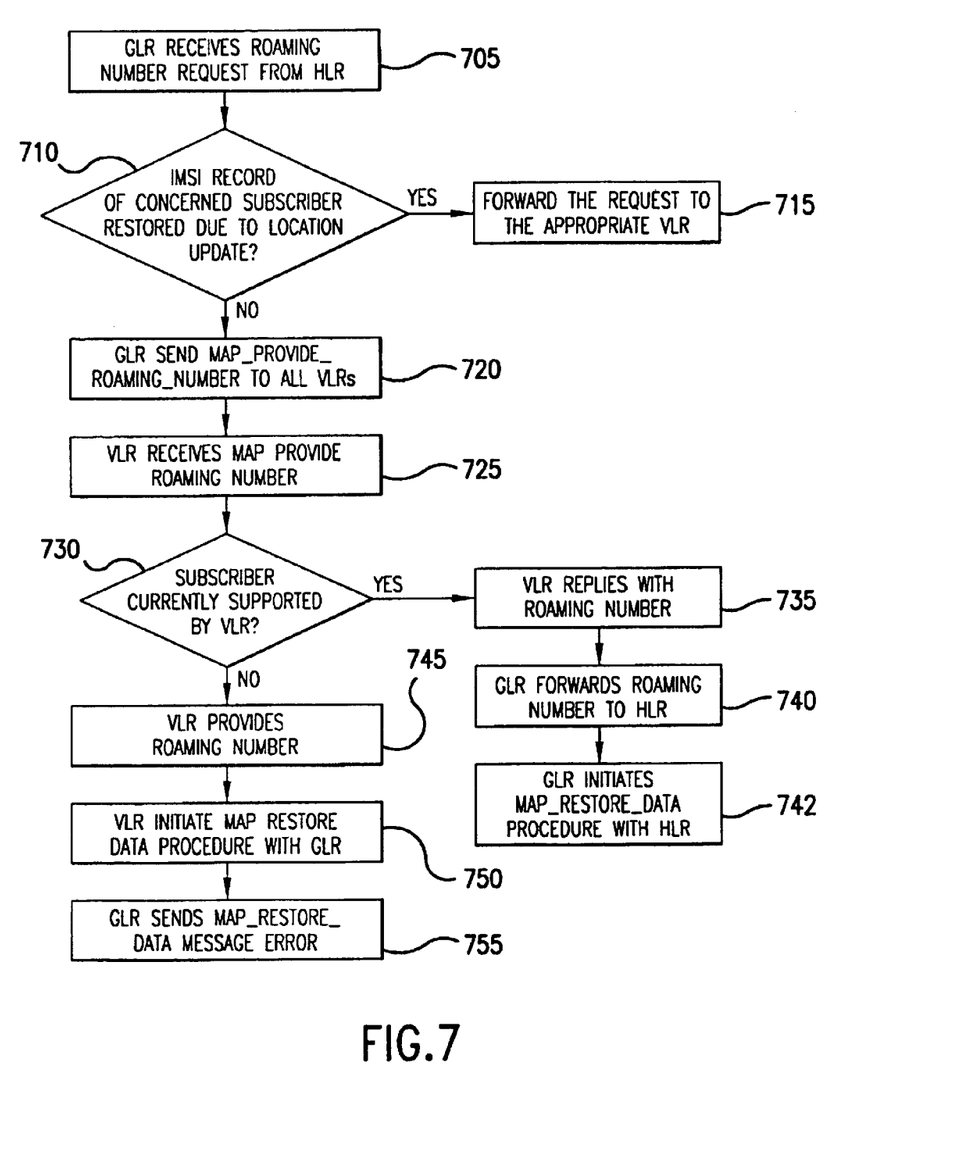
FIG. 7 illustrates an exemplary method in a UMTS system when a GLR, in its role as a VLR, is recovering from a fault in accordance with one embodiment of the present invention.

FIG. 7 illustrates an exemplary method in a UMTS system when a GLR, in its role as a VLR, is recovering from a fault. In accordance with this embodiment of the present invention the GLR does not have a backup memory for its dynamic subscriber data. In step 705 the GLR receives a roaming number request from an HLR. On receipt of a roaming number request from a HLR, the normal behavior of the GLR would be to forward the request to the appropriate VLR, and then forward the returned roaming number associated with a mobile subscriber to the requesting HLR. In this case, however, this can only be done if the IMSI record of the concerned mobile subscriber has been restored due to a location update by the concerned mobile subscriber. Accordingly, in step 710 the GLR determines whether the IMSI record of the concerned subscriber has been restored due to a location update. If the IMSI record has been restored, in accordance with the "Yes" path out of decision step 710, the GLR will forward the request to the appropriate VLR in accordance with step 715.

If the IMSI record for the concerned mobile subscriber has not been restored the GLR will have no data stored for the concerned mobile subscriber, and it will not know to which VLR to forward the roaming number request. Accordingly, if the IMSI record for the concerned subscriber has not been restored, in accordance with the "No" path out of decision step 710, then the GLR sends a MAP_PROVIDE_ROAMING_NUMBER indication to all the VLRs in the network in accordance with step 720. In step 725 a VLR receives the MAP_PROVIDE_ROAMING_NUMBER request. In step 730 the VLR determines whether the mobile subscriber is currently supported by the VLR. If the VLR currently supports the mobile subscriber, in accordance with the "Yes" path out of decision step 730, the VLR will send a reply to the GLR including the roaming number associated with the mobile subscriber in accordance with step 735. In step 740 the GLR forwards the roaming number to the HLR. The GLR then initiates the MAP_RESTORE_DATA procedure towards the HLR in accordance with step 742. Alternatively, the GLR can initiate the MAP_RESTORE_DATA procedure before it sends the MAP_PROVIDE_ROAMING_NUMBER requests to the VLRs, i.e., before step 720.

If the VLR determines that the mobile subscriber is not currently supported by the VLR, in accordance with the "No" path out of decision step 730, the VLR will provide a roaming number to the GLR in accordance with step 745. Even though the VLR will know that it is not supporting the mobile subscriber, the VLR will provide a roaming number in case the VLR's data is incorrect. In step 750 the VLR initiates the MAP_RESTORE_DATA procedure with the GLR. The GLR responds with a MAP_RESTORE_DATA response to the HLR indicating a user error, e.g. "unidentified subscriber" or "resource limitation", or a provider error, e.g. "service completion failure", in accordance with step 755. Alternatively, the VLR can initiate the MAP_RESTORE_DATA procedure towards the GLR before sending the MAP_PROVIDE_ROAMING_NUMBER response message. In such case, after receiving the MAP_RESTORE_DATA response message including an error indication from the GLR, the VLR sends a MAP_PROVIDE_ROAMING_NUMBER response message to the GLR that does not include a roaming number, but instead an error indication, e.g., the provider error "service completion failure", the user error "unidentified subscriber" or the user error "absent subscriber".

Figure 8:
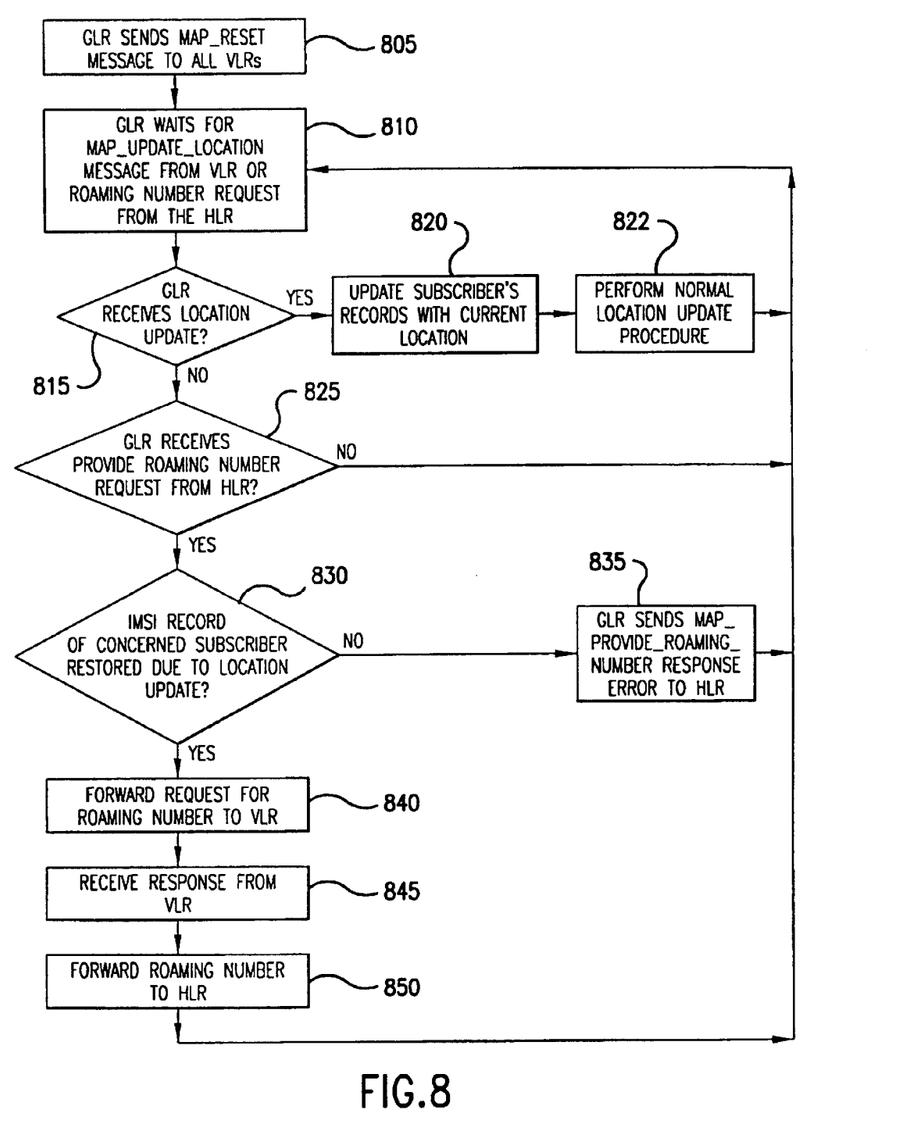
FIG. 8 illustrates another exemplary method in a UMTS system when a GLR, in its roles as an HLR and as a VLR, is recovering from a fault in accordance with one embodiment of the present invention.

FIG. 8 illustrates another exemplary method in a UMTS system when a GLR, in its roles as an HLR and as a VLR, is recovering from a fault. In accordance with this embodiment of the present invention the GLR does not have a backup memory for its dynamic subscriber data. In step 805 the GLR sends a MAP_RESET message to all of the VLRs which the GLR is serving. In step 810 the GLR waits for a MAP_UPDATE_LOCATION message from a VLR or a MAP_PROVIDE_ROAMING_NUMBER request message from an HLR. In step 815 the GLR determines whether it has received a MAP_UPDATE_LOCATION message from a VLR. If the GLR has received a MAP_UPDATE_LOCATION message from a VLR, in accordance with the "Yes" path out of decision step 815, the GLR updates the subscriber's record with the subscriber's current location in accordance with step 820. The location update procedure then continues in a normal manner in accordance with step 822. The GLR then waits for a MAP_UPDATE_LOCATION message from a VLR or a MAP_PROVIDE_ROAMING_NUMBER request message from an HLR in accordance with step 810.

The location update procedure mentioned in connection with step 822 begins with the GLR forwarding the MAP_UPDATE_LOCATION indication message to the HLR which is associated with the concerned mobile subscriber. Then the HLR sends a MAP_INSERT_SUBSCRIBER_DATA indication message to the GLR. The GLR then stores the received mobile subscriber data in the mobile subscriber's record which is then completely restored. Next the GLR forwards the MAP_INSERT_SUBSCRIBER_DATA indication message to the VLR that is serving the mobile subscriber. Subsequently, a MAP_INSERT_SUBSCRIBER_DATA response message is received by the GLR from the VLR and forwarded to the HLR. The normal location update procedure described above in connection with step 822 is completed by the HLR sending a MAP_UPDATE_LOCATION response message to the GLR, which in turn, forwards the message to the appropriate VLR.

If the GLR has not received a MAP_UPDATE_LOCATION message from the VLR, in accordance with the "No" path out of decision step 815, the GLR determines whether it has received a MAP_PROVIDE_ROAMING_NUMBER request message from an HLR in accordance with step 825. If the GLR has not received a MAP_PROVIDE_ROAMING_NUMBER request message, in accordance with the "No" path out of decision step 825, the GLR then waits for a MAP_UPDATE_LOCATION message from a VLR or a MAP_PROVIDE_ROAMING_NUMBER request message from an HLR in accordance with step 810.

If the GLR has received a MAP_PROVIDE_ROAMING_NUMBER request message from the HLR, in accordance with the "Yes" path out of decision step 815, the GLR determines whether the IMSI record of the concerned subscriber has been restored due to a location update in accordance with step 830. If the GLR determines that the IMSI record has not been restored, in accordance with the "No" path out of decision step 830, the GLR sends a MAP_PROVIDE_ROAMING_NUMBER response to the HLR indicating a user error, e.g. "resource limitation", "unidentified subscriber", or a provider error, e.g. "service completion failure". The GLR then waits for a MAP_UPDATE_LOCATION message from a VLR or a MAP_PROVIDE_ROAMING_NUMBER request message from an HLR in accordance with step 810.

If the GLR determines that the IMSI record has been restored, in accordance with the "Yes" path out of decision step 830, the GLR forwards the request for roaming number to the appropriate VLR in accordance with step 840. In step 845 the GLR receives the MAP_PROVIDE_ROAMING_NUMBER response from the VLR. The GLR forwards the MAP_PROVIDE_ROAMING_NUMBER response to the HLR in accordance with step 850. The GLR then waits for a MAP_UPDATE_LOCATION indication message from a VLR or a MAP_PROVIDE_ROAMING_NUMBER request message from an HLR in accordance with step 810. Optionally, the GLR could also initiate a MAP_RESTORE_DATA procedure with the HLR either before or after it sends the MAP_PROVIDE_ROAMING_NUMBER response messages with the error indication to the HLR. i.e., before or after step 835.

Compared to the fault recovery method of FIG. 7, the fault recovery method of FIG. 8 avoids redundant signaling to the VLRs. However, in the method of FIG. 8 a subscriber will not be reachable until a location update for the concerned subscriber is received in the GLR from one of the VLRs which is triggered by the first authenticated radio contact with the mobile subscriber.

Figure 9:
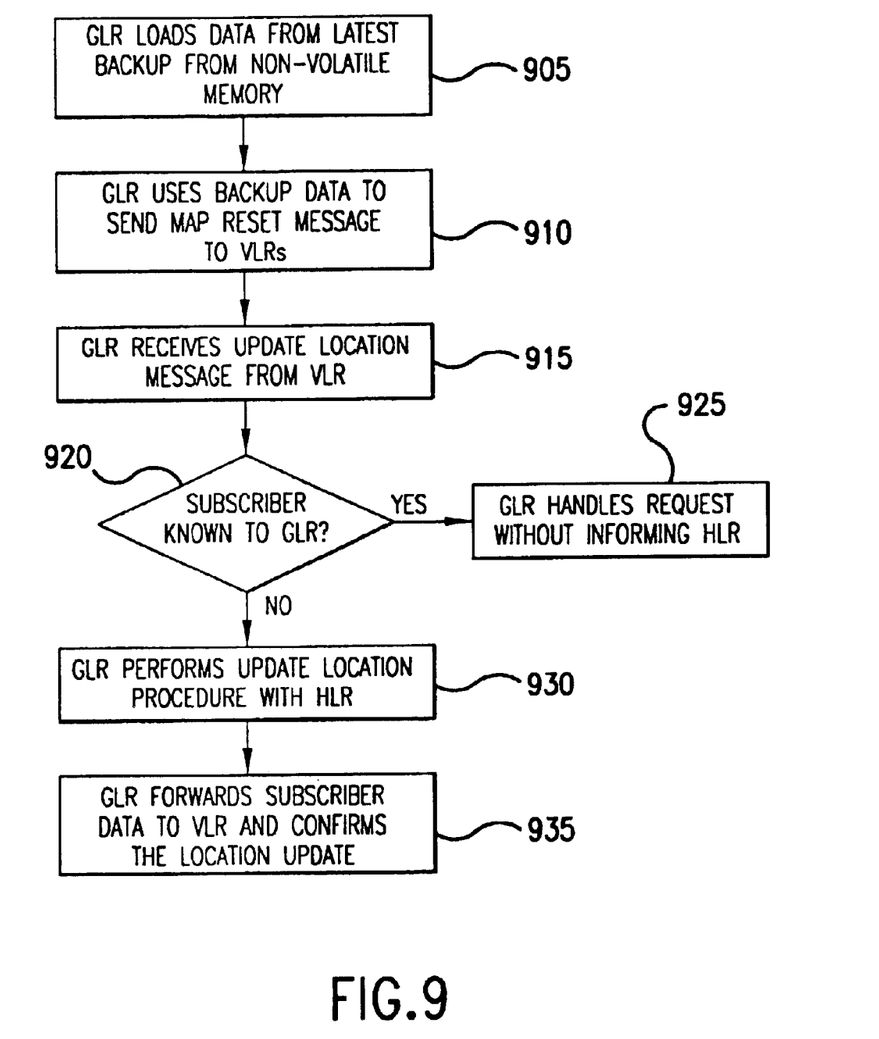
FIG. 9 illustrates an exemplary method in a UMTS system when a GLR, in its role as an HLR, is recovering from a fault in accordance with another embodiment of the present invention.

FIG. 9 illustrates an exemplary method in a UMTS system when the GLR, in its role as an HLR, is recovering from a fault. In accordance with this embodiment of the present invention the GLR has a backup memory for its dynamic subscriber data. In step 905 the GLR uses its non-volatile backup memory to load the data from the latest backup. In step 910 the GLR, based upon the data from the backup memory, sends a MAP_RESET message to the VLRs indicated in the backup memory, i.e. the VLRs containing IMSI records for the concerned subscribers, as indicated by the restored data in the GLR. In step 915 the GLR receives a MAP_UPDATE_LOCATION request from a VLR. On receipt of a MAP_UPDATE_LOCATION request from a VLR, the GLR will determine whether the subscriber is known to the GLR based upon the IMSI records restored from the latest backup in accordance with step 920. If the subscriber is known to the GLR, in accordance with the "Yes" path out of decision step 920, the GLR handles the update location request without informing the HLR in accordance with step 925. If the subscriber is not known to the GLR, in accordance with the "No" path out of decision step 920, the GLR will perform the MAP_UPDATE_LOCATION procedure with the HLR in accordance with step 930. In step 935 the GLR forwards the subscriber data, received during the MAP_UPDATE_LOCATION procedure from the HLR, to the VLR and confirms the location update.

Figure 10:
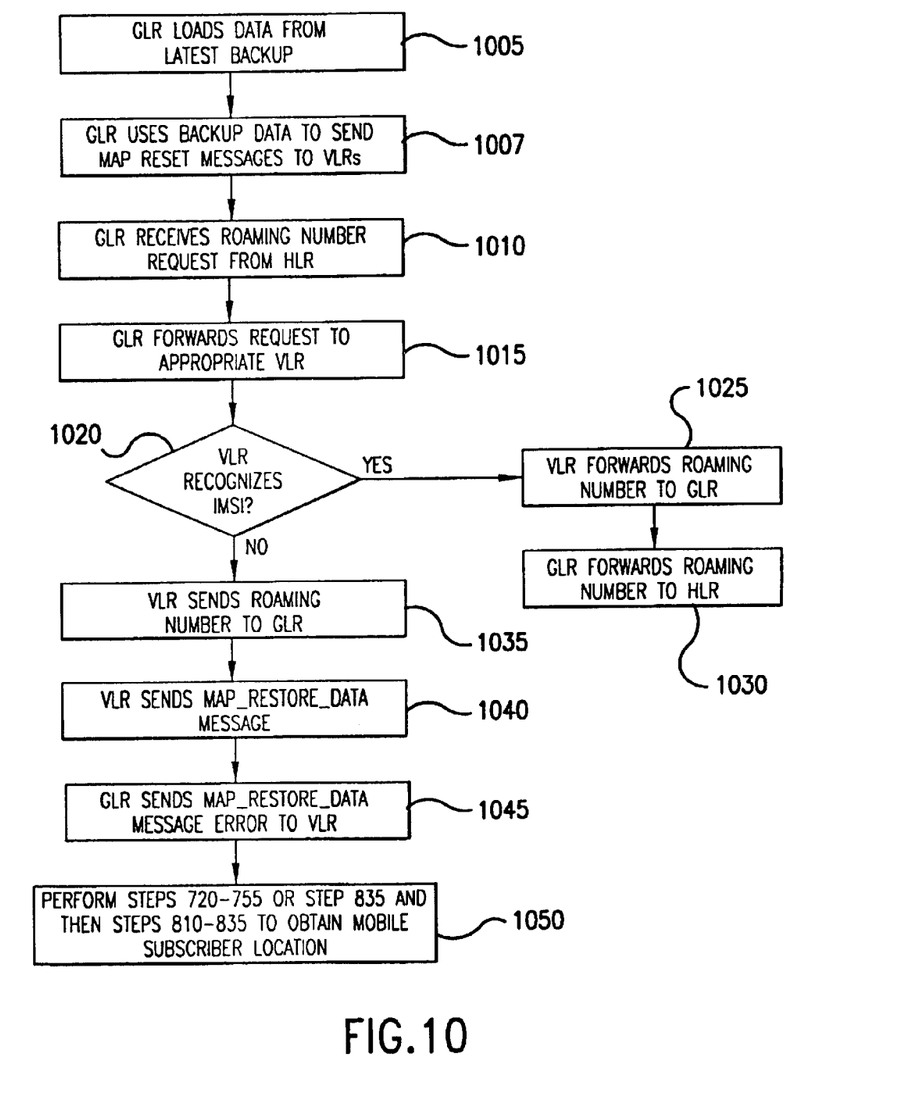
FIG. 10 illustrates an exemplary method in a UMTS system when a GLR, in its roles as an HLR and as a VLR, is recovering from a fault in accordance with another embodiment of the present invention.

FIG. 10 illustrates an exemplary method in a UMTS system when a GLR, in its roles as an HLR and as a VLR, is recovering from a fault. In accordance with this embodiment of the present invention the GLR has a backup memory for its dynamic subscriber data. In step 1005 the GLR loads the data from its backup memory. In step 1007 the GLR, based upon the data from the backup memory, sends a MAP_RESET message to the VLRs indicated in the backup memory, i.e. the VLRs containing IMSI records for the concerned subscribers, as indicated by the restored data in the GLR. In step 1010 the GLR receives a roaming number request for a particular mobile subscriber from an HLR. In step 1015 the GLR forwards the request to the appropriate VLR as indicated by the restored data. Alternatively, if the GLR has received a location update containing the IMSI for the particular mobile subscriber from a VLR before receiving the roaming number request from an HLR, the GLR can forward the roaming number request to the VLR indicated by the location update from a VLR.

In step 1020 the VLR to which the roaming number request was forwarded determines whether the IMSI is known. The GLR may forward the roaming number request to the wrong VLR if the concerned mobile subscriber has moved to another VLR after the latest backup in the GLR but before the GLR has been restarted. If the VLR recognizes the IMSI, in accordance with the "Yes" path out of decision step 1020, the VLR will forward the roaming number to the GLR in accordance with step 1025. The GLR then forwards the roaming number to the requesting HLR in accordance with step 1030.

If the VLR does not recognize the IMSI, in accordance with the "No" path out of decision step 1020, then the VLR still sends a roaming number to the GLR in step 1035. The VLR then sends a MAP_RESTORE_DATA message to the GLR in accordance with step 1040. In response to the MAP_RESTORE_DATA message the GLR sends a MAP_RESTORE_DATA response message indicating a user error, e.g. "unidentified subscriber" or "resource limitation", or a provider error, e.g. "service completion failure", in accordance with step 1045. Since the location information restored from the GLR's backup data apparently was incorrect (possibly because the mobile subscriber has moved to the service area of another VLR after the latest backup was performed in the GLR but before the fault occurred in the GLR) the system will perform steps 720–755 of the method of FIG. 7 to obtain the current location of the mobile subscriber. Of course one skilled in the art will recognize that in step 720 the GLR will not send the MAP provide roaming number message to the VLR which has indicated in step 1020 that the IMSI is unknown. Alternatively, the system can perform step 835 and then steps 810–835 of the method of FIG. 8 to obtain the location of the mobile subscriber. Optionally, the GLR could also initiate the MAP_RESTORE_DATA procedure with the HLR before or after step 835, or if steps 720–755, excluding step 742, are performed the MAP_RESTORE_DATA procedure with the HLR could be initiated before step 720.

If the system performs step 835 and then steps 810-835 of the method of FIG. 8, the GLR can also send a MAP_RESET message to all VLRs in the same network as the GLR which have not yet received a MAP_RESET message. The MAP_RESET message can include the initial digits of the concerned IMSI in the HLR id-list parameter. Since in response to the MAP_RESET messages the VLR will send a MAP_UPDATE_LOCATION message to the GLR at the next authenticated radio contact with the concerned mobile subscriber the amount of time it takes for the GLR to recover from the fault is reduced.

The exemplary embodiments of the present invention described above allow a network including a GLR and VLRs to handle GLR fault recovery situations without violating the GSM MAP specification. The message formats are unchanged and no message sequence is violated. Further, the messages specified in the GSM MAP specification used in the HLR and VLR fault recovery procedures can be used also in the GLR fault recovery procedure in UMTS. Neither the HLRs, nor the VLRs are affected, i.e., their behaviors do not have to be modified in order to cope with the GLR fault recovery procedure.

The present invention has been described by way of exemplary embodiments to which the invention is not limited. Modifications and changes will occur to those skilled in the art without departing from the spirit and scope of the invention as defined in the appended claims.

Deposit of Computer Program Listings

Not Applicable

What is claimed is:

1. In a radio communications network which includes a visitor location register and a gateway location register, a method for recovering from a fault comprising the steps of:
   sending, from the gateway location register, a reset message to all visitor location registers associated with the gateway location register;
   receiving, by the gateway location register, a location update request from one of the visitor location registers associated with the gateway location register;
   updating, in the gateway location register, a location of a mobile subscriber in accordance with a location indicated in the location update message.

2. The method of claim 1, wherein the reset message is a MAP_RESET message.

3. The method of claim 1, wherein the location update request is a MAP_UPDATE_LOCATION request.

4. The method of claim 1, wherein the radio communications network operates according to the UMTS protocol.

5. In a radio communications network which includes a visitor location register and a gateway location register, a method for recovering from a fault comprising the steps of:
- receiving, by the gateway location register, a roaming number request for a mobile subscriber from a home location register associated with the mobile subscriber;
- forwarding the roaming number request from the gateway location register to all visitor location registers associated with the gateway location register; and
- receiving, by the gateway location register, a roaming number from a visitor location register which is serving the mobile subscriber.

6. The method of claim 5, wherein the roaming number request is a MAP_PROVIDE_ROAMING_NUMBER indication message.

7. The method of claim 5, wherein the roaming number received from the visitor location register which is serving the mobile subscriber is contained in a MAP_PROVIDE_ROAMING_NUMBER response message.

8. The method of claim 5, further comprising the steps of:
- receiving, by the gateway location register, a restore data request message from visitor location registers which are not serving the mobile subscriber; and
- sending, from the gateway location register, a restore data response message to the visitor location registers which are not serving the mobile subscriber, the restore data response message contains an error indication.

9. The method of claim 8, wherein the restore data request message is a MAP_RESTORE_DATA indication message.

10. The method of claim 8, wherein the restore data response message is a MAP_RESTORE_DATA response message.

11. In a radio communications network which includes a visitor location register and a gateway location register, a method for recovering from a fault comprising the steps of:
- loading, in the gateway location register, data from a backup memory;
- receiving, by the gateway location register, a roaming number request for a mobile subscriber from a home location register associated with the mobile subscriber; and
- forwarding the roaming number request from the gateway location register to a visitor location register, wherein the data loaded from the backup memory indicates that the visitor location register is serving the mobile subscriber.

12. The method of claim 11, wherein the roaming number request is a MAP_PROVIDE_ROAMING_NUMBER indication message.

13. The method of claim 11, further comprising the steps of: receiving, by the gateway location register, a roaming number from the visitor location register which is serving the mobile subscriber;
- forwarding, by the gateway location register, the roaming number to the home location associated with the mobile subscriber.

14. The method of claim 13, wherein the roaming number is received and forwarded in a MAP_PROVIDE_ROAMING_NUMBER response message.

15. The method of claim 11, further comprising the steps of:
- receiving, by the gateway location register, a message indicating that the mobile subscriber is not being served by the visitor location register; and
- sending, by the gateway location register, a reset message to all visitor location registers associated with the gateway location register other than the visitor location register from which the gateway location register received the message indicating that the mobile subscriber is not being served.

16. In a radio communications network which includes a visitor location register and a gateway location register, a method for recovering from a fault comprising the steps of:
- sending, from the gateway location register, a reset message to all visitor location registers associated with the gateway location register; and
- waiting, by the gateway location register, for a location update message from a visitor location register which indicates that the subscriber indicated in the location update message is being served by the visitor location register.

17. The method of claim 16, wherein the location update message is a MAP_UPDATE_LOCATION message.

18. The method of claim 16 further comprising the step of:
- receiving, by the gateway location register from a home location register, a roaming number request for a mobile subscriber associated with the home location register; and
- sending a roaming number response message from the gateway location register to the home location register, wherein the roaming number response message includes an error indication.

19. The method of claim 18, wherein the roaming number request message is a MAP_PROVIDE_ROAMING_NUMBER request message.

20. The method of claim 18, wherein the roaming number response message is a MAP_PROVIDE_ROAMING_NUMBER response message.

* * * * *